US009073571B2

(12) United States Patent
Muramatsu et al.

(10) Patent No.: US 9,073,571 B2
(45) Date of Patent: Jul. 7, 2015

(54) HANDLE

(71) Applicant: NIHON PLAST CO., LTD., Fujinomiya-shi, Shizuoka (JP)

(72) Inventors: Katsuya Muramatsu, Fujinomiya (JP); Tomohiro Sakurai, Fujinomiya (JP); Takaaki Seki, Fujinomiya (JP)

(73) Assignee: NIHON PLAST CO., LTD., Fujinomiya-shi (JP)

( * ) Notice: Subject to any disclaimer, the term of this patent is extended or adjusted under 35 U.S.C. 154(b) by 0 days.

(21) Appl. No.: 14/037,427

(22) Filed: Sep. 26, 2013

(65) Prior Publication Data
US 2014/0083235 A1 Mar. 27, 2014

(30) Foreign Application Priority Data

Sep. 26, 2012 (JP) ................................. 2012-212983
Mar. 28, 2013 (JP) ................................. 2013-067920

(51) Int. Cl.
*B62D 1/16* (2006.01)
*B62D 1/06* (2006.01)
*B62D 1/11* (2006.01)

(52) U.S. Cl.
CPC ... *B62D 1/06* (2013.01); *B62D 1/11* (2013.01)

(58) Field of Classification Search
USPC ................ 74/492, 552, 557; 280/731, 728.1; 200/61.57, 61.54
See application file for complete search history.

(56) References Cited

U.S. PATENT DOCUMENTS

| 3,819,205 | A | * | 6/1974 | Dunford et al. | 280/731 |
| 4,390,193 | A | * | 6/1983 | Strahan et al. | 280/777 |
| 5,066,038 | A | * | 11/1991 | Frantom et al. | 280/737 |
| 5,310,218 | A | * | 5/1994 | Miyoshi et al. | 280/777 |
| 5,383,682 | A | * | 1/1995 | Nagata et al. | 280/777 |
| 7,185,915 | B2 | * | 3/2007 | Fujita et al. | 280/731 |
| 7,475,902 | B2 | * | 1/2009 | Shiga et al. | 280/731 |
| 2001/0039851 | A1 | * | 11/2001 | Hosoi et al. | 74/552 |
| 2005/0230943 | A1 | * | 10/2005 | Thomas | 280/731 |
| 2006/0054479 | A1 | * | 3/2006 | Iisaka et al. | 200/61.57 |

FOREIGN PATENT DOCUMENTS

EP 0488618 A1 6/1992
JP H11-59435 A 3/1999
(Continued)

OTHER PUBLICATIONS

The UK office action issued on Apr. 15, 2014 in the counterpart UK patent application.

*Primary Examiner* — Ruth Ilan
*Assistant Examiner* — Darlene P Condra
(74) *Attorney, Agent, or Firm* — Marvin A. Motsenbocker; Mots Law, PLLC

(57) ABSTRACT

A lower spoke cored bar of a spoke cored bar constituting a spoke portion couples one end portion of a first coupling portion to a rim cored bar. The lower spoke cored bar couples one end portion of a second coupling portion to a boss cored bar. The lower spoke cored bar is provided with a vertical wall portion which couples a bending-shaped first bent portion to the other end portion of the first coupling portion, and which couples a second bent portion in a bending form to the other end portion of the second coupling portion. The rim cored bar is provided with a deformation allowing portion capable of deforming. The vertical wall portion and deformation allowing portions are arranged substantially on the same line.

5 Claims, 6 Drawing Sheets

(56) References Cited

FOREIGN PATENT DOCUMENTS

| JP | 2007-296922 A | 11/2007 |
| JP | 2009208571 A | 9/2009 |
| JP | 2011-213250 A | 10/2011 |
| WO | 2013118590 A1 | 8/2013 |

* cited by examiner

HANDLE

BACKGROUND OF THE INVENTION

1. Field of the Invention

The present invention relates to a handle in which a module is attached to a handle main body.

2. Related Background of the Invention

Conventionally, in a vehicle such as a motor vehicle, there is used a steering wheel as a handle provided with a steering wheel main body having a rim portion which is formed as an annular shape, a boss portion which is positioned inside the rim portion, and a plurality of spoke portions which couple the rim portion and the boss portion. In addition, there is proposed a steering wheel configured such that a module constituting an airbag device, a hone device and the like is attached to the boss portion of the steering wheel main body, a cored bar of the spoke portion in the steering wheel main body deforms in the case where an excessive force is applied and thus an occupant is protected at the time of collision of the motor vehicle and the like (refer to Patent Document 1).

On the other hand, today, a fixing configuration is known that a module, an airbag device or like, can be engaged with a steering wheel main body by engagement of so-called one-touch operation in replacing with a threadable engagement of a nut with attaching bolt, and this configuraton is used in order to reduce manufacturing cost. For example, the configuration is known that a fixed plate fixed to the steering wheel main body is engaged with a movable plate of a horn device (for example, Patent Document 2). In this configuration, the fixed plate is provided with a pair of engagement pawls protruding upward, and at a tip side of the pair of engagement pawls, pawl portions is formed which protrude inside with each other. And the movable plate is provided with a coil spring, a part of the coil spring extends and constitutes an arm portion. By inserting the arm portion into the inside space of the pair of engagement pawls, the arm portion engages with pawl portions of engagement pawls, thus the horn device is fixed to the steering wheel main body.

In the above mentioned configuration that the arm portion simply engages with the pawl portions of engagement pawls, a load is input on the steering wheel main body at a time of collision of motor vehicle, and further configurations are needed in order to avoid detachment of the engagement state between the arm portion and the pawl portions in a case of deformation of cored bar of the steering wheel main body. The further configurations are, for example, setting the pawl portions at a position on which the deformation of cored bar does not influence, the enlargement of size of the pawl portions, or tightening of the arm portion to be energized. However there is a problem that a structure of handle becomes more complicated and manufacturing cost is increased in these further needed configurations.

In order to avoid the above mentioned problem, a configuration is known that an engagement pawl portion provided in the cored bar of the steering wheel main body is engaged with an engagement receiver of a wire provided in the module, a connecting cored bar is connected to a spoke cored bar constituting a spoke portion, and the engagement pawl portion and a pedestal part are located on the connecting cored bar (for example, Patent Document 3). In this configuration, when the occupant moves forward and a load is input on the steering wheel main body, the pedestal part is pushed forward, and the cored bar deforms around the connecting cored bar. Thus, by incresing an amount of engagement of the engagement receiver with the engagement pawl portion during deformation of cored bar of the steering wheel main body, it is achieved that the detachment of module is avoided without increasing of manufacturing cost.

PRIOR ART DOCUMENT

Patent Document

[Patent Document 1] Japanese Patent Application Laid-Open Publication No. 11-59435 (pages 3 to 5 and FIG. 5)

[Patent Document 2] Japanese Patent Application Laid-Open Publication No. 2007-296922 (page 1 and FIGS. 1 to 4)

[Patent Document 3] Japanese Patent Application Laid-Open Publication No. 2011-213250 (pages 3 to 9 and FIGS. 1 to 10)

SUMMARY OF THE INVENTION

For example, in a steering wheel of Patent Document 1, spoke portion cored bars positioned on the right and left sides of the steering wheel are coupled to a boss portion by a coupling cored bar, and the spoke portion cored bar in a driver seat side is coupled to the right and left two positions of the coupling cored bar, by a coupling bar. In this configuration, the coupling bar extends to an occupant side so that the coupling bar is orthogonal to the coupling cored bar, and is coupled to the spoke portion cored bar on the driver seat side via a hinge portion. In addition, the coupling cored bar has a linear straight portion which extends along a direction substantially orthogonal to the spoke cored bar on the driver seat side, and an inclined portion which is adjacent to the straight portion, and is configured such that the coupling bar tends to twist at a position of the inclined portion in the case where the straight portion is curved in a back face direction by existence of the inclined portion, when a load is input from the driver seat side by the occupant at the time of collision or the like. However, in the case of this configuration, fluctuation generated in the case where the load is applied is widely varied in each of a curving direction and a twisting direction, and there is a problem in which a special configuration for stably absorbing the load is further necessary.

Moreover, for a steering wheel of Patent Document 3, in case of a configuration that the engagement pawl portion is engaged with the engagement receiver such that the module is fixed to the steering wheel main body, it is demanded that the configuration can reliably increase an amount of engagement of the engagement receiver with the engagement pawl portion during deformation of cored bar of the steering wheel main body.

The present invention has been made in view of such problems, and an object of the present invention is to provide a handle which can stably and efficiently absorb a load on the basis of deformation of a handle main body and can reliably retain the module without being detached during deformation of a handle main body.

The present invention relates to a handle having a handle main body and a module which is attached to the handle main body, and the handle main body is provided with: an operating rim portion arranged at a position facing an occupant; a boss portion connected to a steering device; a spoke portion connecting the rim portion and the boss portion; a rim cored bar constituting the rim portion; a boss cored bar constituting the boss portion; and a spoke cored bar being connected to the rim cored bar and the boss cored bar and constituting the spoke portion, the spoke cored bar is provided with a first coupling portion, a second coupling portion and a continuous portion, one end portion of the first coupling portion is coupled to the rim cored bar, one end portion of the second coupling portion is coupled to the boss cored bar, the continuous portion has a first bent portion coupled to the other end portion of the first coupling portion at its one end portion, the continuous portion has a second bent portion coupled to the other end portion of the second coupling portion at its other end portion, the handle main body is further provided with an engagement pawl portion provided in a protruding manner in the spoke cored bar, the module is provided with an engagement receiver engaged with the engagement pawl portion, and the engagement pawl portion is arranged at the continuous portion, and is arranged at a position between the first bent portion and the second bent portion.

The present invention is preferably configured such that the first bent portion and the second bent portion are positioned between a center position which is between two positions of an outer edge portion of the rim cored bar and a coupling position of the second coupling portion and the boss cored bar, and the coupling position of the second coupling portion and the boss cored bar.

The first bent portion and the second bent portion are preferably weak portions more easily deformed than the other portions of the continuous portion.

The rim cored bar has preferably a plurality of deformation allowing portions capable of being deformed, and the continuous portion and the deformation allowing portions are arranged substantially on the same straight line.

The deformation allowing portions are preferably weak portions more easily deformed than the other portions of the rim cored bar.

DESCRIPTION OF THE PREFERRED EMBODIMENTS

Figure 1:
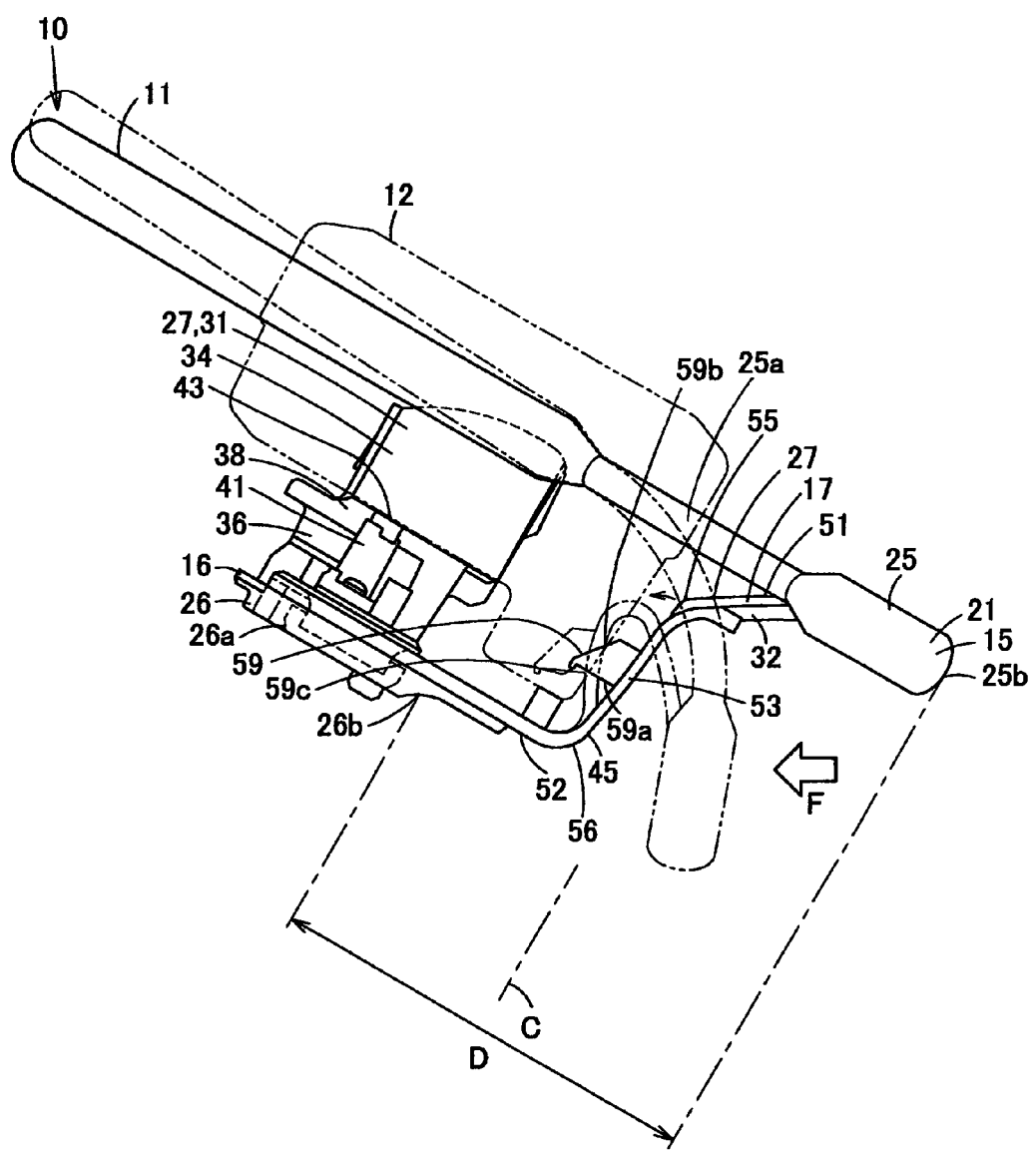
FIG. 1 is shows an embodiment according to the present invention and is an explanatory view showing a deforming motion of a cored bar in a handle.

Hereinafter, there will be a description of an embodiment of a handle according to the present invention with reference to the accompanying drawings.

In FIGS. 1 to 5, reference numeral 10 denotes a steering wheel serving as a handle. The steering wheel 10 is arranged in a front of an occupant in a driver seat of a motor vehicle, and is constituted by a steering wheel main body 11 serving as a handle main body, an airbag device 12 being mounted on an occupant side of the steering wheel main body 11 and serving as a module, and the like.

In addition, the steering wheel 10 is mounted on a steering shaft being generally provided in an inclined state, not illustrated and serving a steering device. In the following description, directions such as back and forth direction and an up and down direction will be described by assuming the airbag device 12 side as an occupant side, a front face side or a rear side, assuming the steering shaft side as a vehicle body side, a back face side or a front side, assuming a back and forth direction along the steering shaft as an axial direction, and assuming a forward-moving direction of a vehicle body provided with the steering wheel 10 as reference.

Furthermore, the steering wheel main body 11 is constituted by an annular rim portion (a ring portion) 15, a boss portion (a mount portion) 16 positioned on an inner side of the rim portion 15 and connected to the steering shaft, and a plurality of, for example, three spoke portions 17 in the present embodiment, which couple the rim portion 15 and the boss portion 16.

Moreover, the steering wheel main body 11 is provided with a metal cored bar 21, a soft coating portion 22 which integrally covers a part of the cored bar 21, a cover body 24 which covers a back face side of the cored bar 21, and the like.

In addition, the cored bar 21 is provided with a rim cored bar 25, a boss cored bar 26 and a spoke cored bar 27 in response to the rim portion 15, the boss portion 16 and the spoke portion 17.

The rim cored bar 25 constitutes the rim portion 15, the boss cored bar 26 constitutes the boss portion 16, the spoke cored bar 27 is connected to the rim cored bar 25 and the boss cored bar 26, and the spoke cored bar 27 constitutes the spoke portion 17.

In addition, the boss cored bar 26 is also referred to as a boss plate or the like, and is provided with a cylindrical boss 26a which is fitted and attached to the steering shaft, and a part of the boss cored bar 26, the annular rim cored bar 25 and the radially arranged spoke cored bar 27 are integrally formed by an insert molding of a magnesium alloy or the like while arranging the boss 26a in a metal mold. Furthermore, the cored bar 21 is configured so as to deform and move in a state in which a great force is applied to the cored bar, and absorb shock in order to protect an occupant. Particularly, deformation allowing portions 25a and 25a allowing deformation in a state in which the great force is applied are formed as a narrower portion than the other portions on both sides of a lower side of the rim cored bar 25. That is, the deformation allowing portions 25a and 25a are weak portions which are more vulnerable (more easily deformed) than the other portions of the rim cored bar 25, and are arranged bilateral-symmetrically, for example, in the rim cored bar 25. Moreover, the deformation allowing portions 25a and 25a are areas which are curved in a circular-arc shape along a peripheral direction of the rim cored bar 25.

Figure 2:
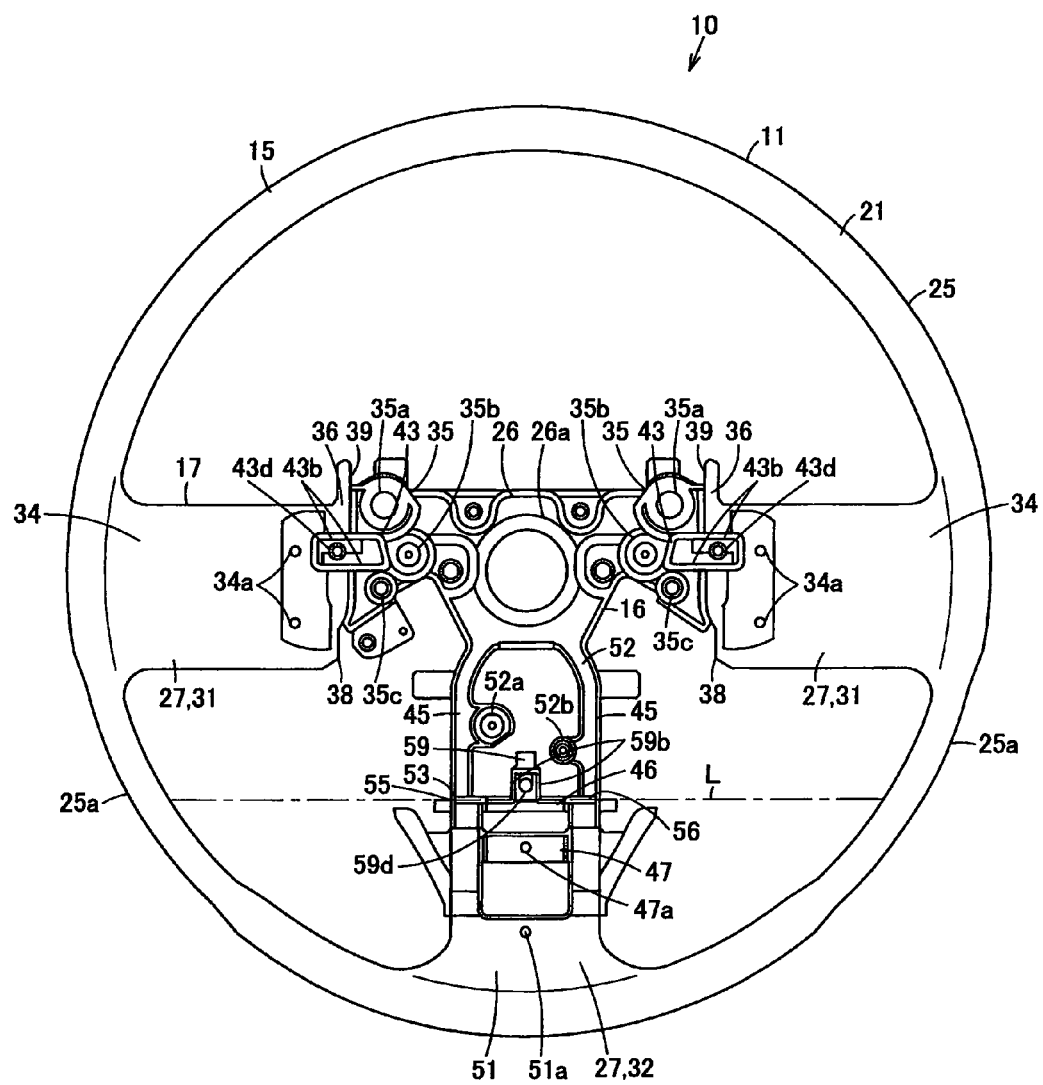
FIG. 2 shows the embodiment according to the present invention and is a plan view of the cored bar of the handle.
Figure 3:
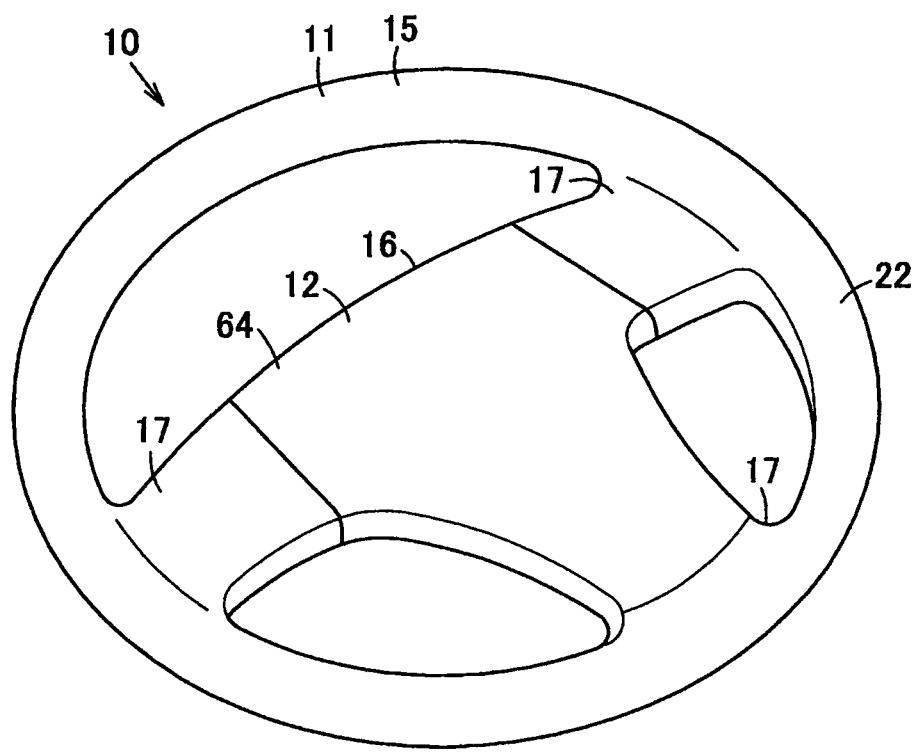
FIG. 3 shows the embodiment according to the present invention and is a perspective view of the handle.
Figure 4:
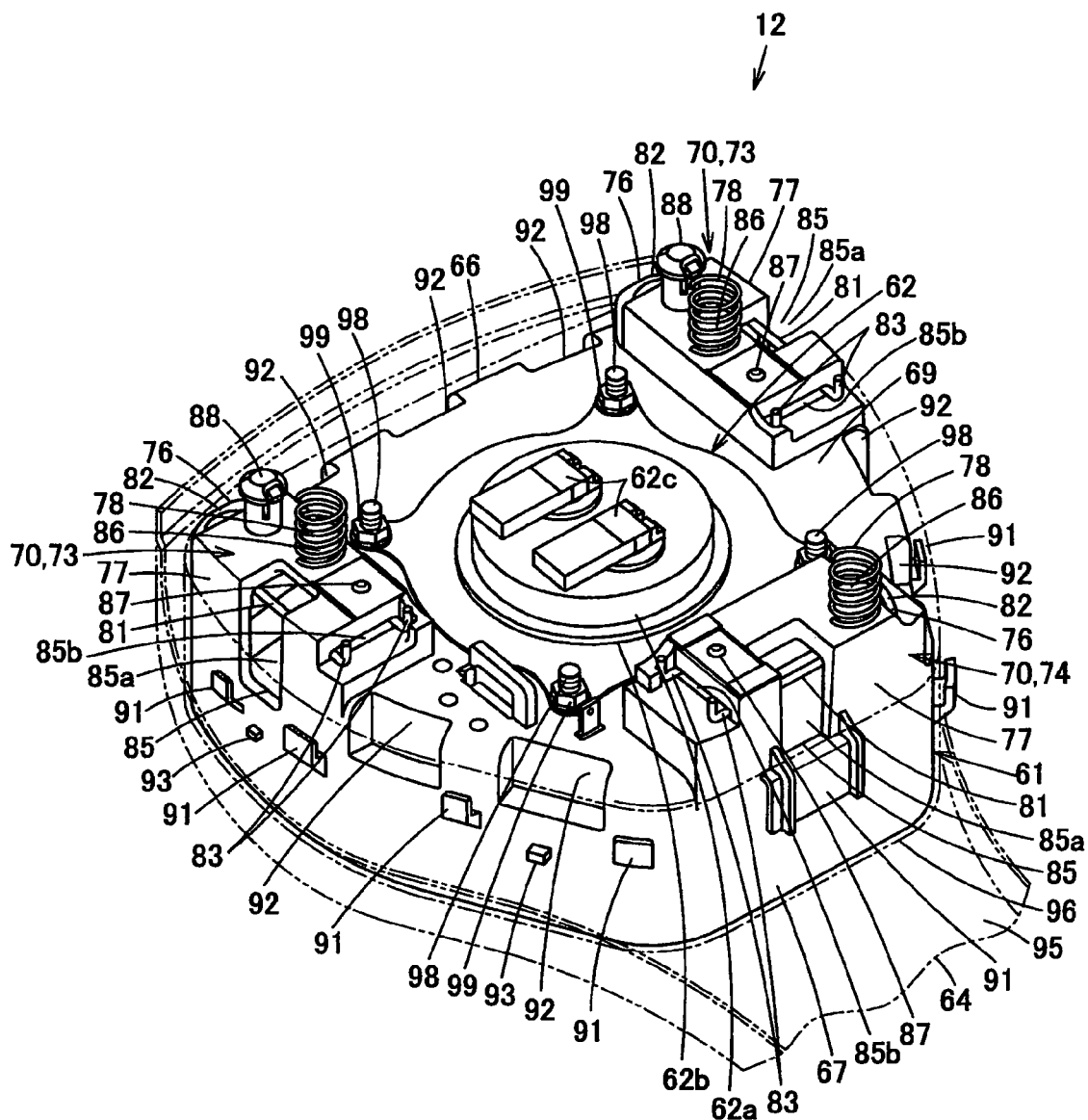
FIG. 4 shows the embodiment according to the present invention and is a perspective view showing a module of the handle from the below.
Figure 5:
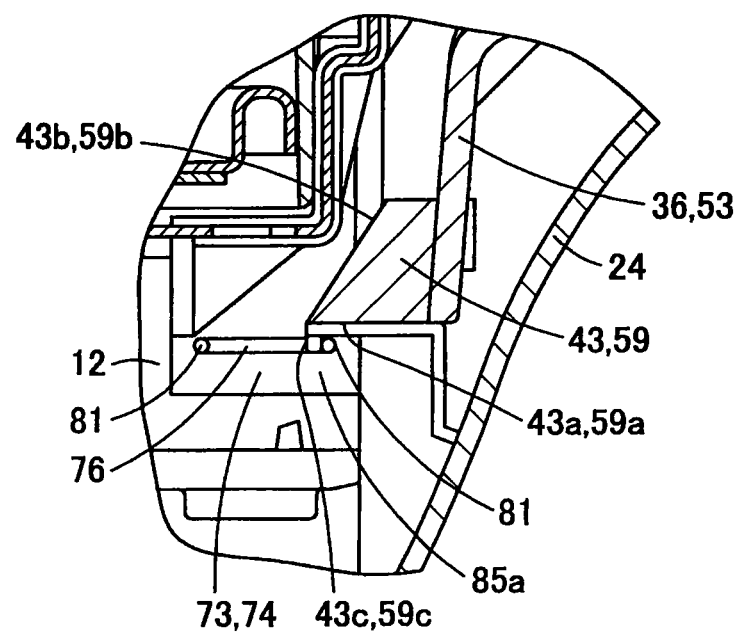
FIG. 5 shows the embodiment according to the present invention and is a cross-sectional view of a part of the handle.

In FIG. 2, the deformation allowing portions 25a and 25a are shown as partly narrow areas in the annular rim cored bar 25. A part of the portion constituting a lower half of the rim cored bar 25 corresponds to the deformation allowing portions 25a and 25a.

Further, the spoke cored bar 27 is provided with a pair of side spoke cored bars 31 on both sides, which extend from an upper side portion of the boss cored bar 26 to both sides, and a lower spoke cored bar 32 extending downward from a lower side portion of the boss cored bar 26 and serving as a bendable portion.

Each of the side spoke cored bars 31 has a rim portion side coupling portion 34 which couples its one end portion, to an inner edge of a side portion of the rim cored bar 25, a boss portion side coupling portion 35 which couples its upper end portion as one end portion to a side portion of the boss 26a, and a vertical wall coupling portion 36 which extends between the coupling portions 34 and 35 along a front-face-to-back-face direction and which serves as a coupling portion. The bending is performed between the rim portion side coupling portion 34 and the vertical wall coupling portion 36, and between the vertical wall coupling portion 36 and the boss portion side coupling portion 35, and each of the side spoke cored bars 31 is bent in a stepwise shape.

The rim portion side coupling portion 34 extends toward a center portion side of the rim cored bar 25, from an inner edge of the side portion of the rim cored bar 25 to a back face direction. Furthermore, at the rim portion side coupling portion 34, there are formed a pair of positioning holes 34a and 34a in a circular-hole shape, for fixing the airbag device 12, so as to pass through in the front-face-to-back-face direction.

In addition, the boss portion side coupling portion 35 extends toward a side direction that is the rim cored bar 25 side, from the side portion of the boss 26a in the boss cored bar 26. Furthermore, the boss portion side coupling portion 35 is provided with a guide receiver 35a which is positioned at the side portion of the boss cored bar 26 and which is for guiding the airbag device 12; a spring receiver 35b; and a fixed contact point portion 35c, and the guide receiver 35a, the spring receiver 35b and the fixed contact point portion 35c are arranged sequentially from an upper side to a lower side in a state in which the steering wheel main body 11 is inclined.

Moreover, in an end portion on a front face side of the vertical wall coupling portion 36 corresponding to one end portion, the vertical wall coupling portion 36 is provided with a rim portion side bent portion 38 coupled to the other end portion of the rim portion side coupling portion 34. And at an end portion on a back face side of the vertical wall coupling portion 36 corresponding to the other end portion, the vertical wall coupling portion 36 is provided with a boss portion side bent portion 39 coupled to the other end portion of the boss portion side coupling portion 35. And the vertical wall coupling portion 36 is bent in a stepwise shape. Furthermore, in the vertical wall coupling portion 36, a notch portion 41 is formed into a longitudinal shape along the front-face-to-back-face direction in a center portion, and there are formed side engagement pawl portions 43 serving as (first and second) engagement pawl portions at positions on the front face side of the notch portion 41, toward the center side of the steering wheel main body 11.

The side engagement pawl portion 43 may be referred to as a side engagement pawl or a one-touch hook, and is configured such that a back face side forms a locking surface 43a which is vertical to the front-face-to-back-face direction, and a front face side forms a guide surface 43b which is inclined to the locking surface 43a. In addition, on the locking surfaces 43a of the side engagement pawl portions 43, projection portions 43c are provided so as to protrude to the back face side. Furthermore, at the side engagement pawl portions 43, cover positioning holes 43d in a circular-hole shape for positioning the cover body 24 are formed so as to pass through in the front-face-to-back-face direction.

Moreover, the lower spoke cored bar 32 is provided with a pair of rod-like portions 45 and 45 corresponding to two cored bar main body portions which are parallel to each other, in a rectangular column shape (rod shape), and a coupling cored bar portion 46 and an attaching portion 47 which couple the rod-like portions 45 and 45 to each other. The rod-like portions 45 and 45 are bent in a stepwise shape (a crank shape), and respective portions of stepwise shape form a first coupling portion 51 which couples its lower end portion that is one end portion, to an inner edge of the lower portion of the rim cored bar 25, a second coupling portion 52 which couples its upper end portion that is one end portion, to the lower portion of the boss 26a of the boss cored bar 26, and a vertical wall portion 53 which extends between the first and second coupling portions 51 and 52, along the front-face-to-back-face direction, and which serves as a continuous portion.

Each of the rod-like portions 45 is formed as a rectangular cross-sectional shape in which a thickness along the front-face-to-back-face direction (an axial direction of the steering shaft) is smaller than a thickness (a width) in a lateral direction. Accordingly, the rod-like portions 45 can be easily deformed in the front-face-to-back-face direction, and are hard to relatively deform in a direction including a lateral direction component.

The first coupling portion 51 extends upward from the inner edge of the lower portion of the rim cored bar 25 to the back face direction. That is, the first coupling portion 51 radially extends along a diametrical direction of the rim cored bar 25 (the rim portion 15) as seen from a front face. In addition, at a center portion of the first coupling portion 51, there is formed a positioning hole 51a in a circular-hole shape for fixing the airbag device 12, so as to pass through in the front-face-to-back-face direction.

Furthermore, the second coupling portion 52 extends downward from the lower portion of the boss 26a of the boss cored bar 26. That is, the second coupling portion 52 radially extends along the diametrical direction of the rim cored bar 25 (the rim portion 15) as seen from the front face, and is along a direction which intersects with (is orthogonal to) the steering shaft. In addition, at the second coupling portion 52, a spring receiver 52a is provided in a protruding manner, for example, from the one rod-like portion 45 toward the other rod-like portion 45, and a fixed contact point portion 52b is provided in a protruding manner from the other rod-like portion 45 toward the one rod-like portion 45.

Further, as shown in FIG. 1, the vertical wall portion 53 extends linearly along a direction which is slightly inclined from a direction which is parallel to the steering shaft, and is configured such that a rear end portion corresponding to one end portion is coupled to an upper end portion corresponding to the other end portion of the first coupling portion 51 by a first bent portion 55 that is a first bending point, and a front end portion corresponding to the other end portion is coupled to a lower end portion that is the other end portion of the second coupling portion 52 by a second bent portion 56 that is a second bending point. Accordingly, the rod-like portion 45 is bent at positions of the first bent portion 55 and the second bent portion 56 in a side elevational view, and is bent in a stepwise shape as a whole.

That is, the lower spoke cored bar 32 is provided with the first coupling portion 51, the second coupling portion 52 and the vertical wall portion 53 that is a continuous portion, one end portion of the first coupling portion 51 is coupled to the rim cored bar 25, one end portion of the second coupling portion 52 is coupled to the boss cored bar 26, the vertical wall portion 53 has, at its one end portion, the first bent portion 55 which is coupled to the other end of the first coupling portion 51, and the vertical wall portion 53 has, at its other end portion, the second bent portion 56 which is coupled to the other end portion of the second coupling portion.

Furthermore, as shown in FIG. 2, the attaching portion 47 is positioned between a pair of first bent portions 55 of a pair of rod-like portions 45, and the coupling cored bar portion 46 is positioned between a pair of second bent portions 56 of a pair of rod-like portions 45. A lower engagement pawl portion 59 corresponding to a (third) engagement pawl portion is formed toward a center side of the steering wheel main body 11, that is, a front upper side in a state in which the steering wheel main body 11 is inclined, at the coupling cored bar portion 46. In other words, the lower engagement pawl portion 59 is arranged at the vertical wall portion 53 corresponding to the continuous portion, and is formed and arranged between the first bent portion 55 and the second bent portion 56.

As shown in FIG. 1, a center position C is set to a position dividing, into two equal parts, a distance D in a diametrical direction of the steering wheel main body 11 (the rim portion 15 and the rim cored bar 25) between an outer edge portion 25b on a lower side (an occupant side) of the rim cored bar 25, and a coupling position 26b between the second coupling portion 52 and the boss cored bar 26.

At this time, in the present embodiment, the vertical wall portion 53 (the bent portions 55 and 56, and the lower engagement pawl portion 59) is positioned in an area between the center position C and the coupling position 26b.

Note that the area between the center position C and the coupling position 26b includes each of the center position C and the coupling position 26b, and in the present embodiment, the vertical wall portion 53 (the first bent portion 55, the second bent portion 56 and the lower engagement pawl portion 59) is positioned in the area sandwiched by the center position C and the coupling position 26b.

That is, the vertical wall portion 53 is positioned closer to the boss cored bar 26 than the rim cored bar 25 along the diametrical direction of the steering wheel main body 11 (the rim portion 15 and the rim cored bar 25) which is a longitudinal direction of the lower spoke cored bar 32, in a state in which the steering wheel main body 11 is seen from a front face (an axial direction).

In addition, the vertical wall portion 53 is positioned substantially on the same straight line L along a vehicle width direction together with the deformation allowing portions 25a and 25a, as seen from the occupant side (the front face). In other words, the vertical wall portion 53 is arranged at a position which at least partly intersects with a virtual line L connecting between the deformation allowing portions 25a and 25a as seen from the front face.

In other words, as seen from the front face, the vertical wall portion 53 is positioned within a band-like range from a virtual line which connects an upper end portion (one end portion) of the one deformation allowing portion 25a and an upper end portion (one end portion) of the other deformation allowing portion 25a, to a virtual line which connects a lower end portion (the other end portion) of the one deformation allowing portion 25a and a lower end portion (the other end portion) of the other deformation allowing portion 25a.

In addition, the first and second bent portions 55 and 56 form a weak portion which is more vulnerable (more easily deformed) than the other portion of the vertical wall portion 53.

Furthermore, as shown in FIG. 1, the second bent portion 56 is positioned slightly closer to the boss cored bar 26 in the diametrical direction of the steering wheel main body 11 (the rim portion 15 and the rim cored bar 25) corresponding to the longitudinal direction of the lower spoke cored bar 32, with respect to the first bent portion 55. Since both end portions of the vertical wall portion 53 form the first bent portion 55 and the second bent portion 56, the vertical wall portion 53 extends linearly in a direction which is slightly inclined from a parallel direction to the steering shaft.

The lower engagement pawl portion 59 may be referred to as a lower engagement pawl or a one-touch hook, and is configured such that its back face side forms a locking surface 59a which is vertical to a front-face-to-back-face direction, and its front face side forms a guide surface 59b which is inclined to the locking surface 59a. In addition, on the locking surface 59a of the lower engagement pawl portion 59, a projection portion 59c is provided so as to protrude to the back face side. Furthermore, in the lower engagement pawl portion 59, a cover positioning hole 59d in a circular-hole shape for positioning the cover body is formed so as to pass through in the front-face-to-back-face direction.

Moreover, the attaching portion 47 is provided along a lateral direction in parallel to the coupling cored bar portion 46, at a position which is spaced to a front face side (the first coupling portion 51 side) of the coupling cored bar portion 46. In the attaching portion 47, there is formed a positioning hole 47a in a circular-hole shape for fixing the airbag device 12 is formed so as to pass through in the front-face-to-back-face direction.

Further, the coating portion 22 is formed softly by a urethane, for example, a soft foamed polyurethane, in a manner that covers an outer peripheral portion of the rim cored bar 25, and an outer peripheral portion of the portion closer to the rim portion 15 side of the spoke cored bar 27.

Furthermore, the cover body 24 is also referred to as a body cover, a lower cover, a rear cover or the like, covers the boss portion 16 of the steering wheel main body 11 and a back face side, that is, a back face side of the portion closer to the boss portion 16 at the spoke portion 17, and is integrally formed by injection or the like of a thermoplastic resin having an insulating property, into a metal mold. In addition, in the cover body 24, its both side portions and lower portion are respectively attached and fixed to the cover positioning holes 43d and 43d and the cover positioning hole 59d.

In contrast, the airbag device 12 is provided with a base plate 61 which corresponds to a main body case, an inflator 62 which is attached to the base plate 61, an airbag which is not illustrated, an airbag cover 64 which corresponds to a cover body, a retainer which is not illustrated and the like.

The base plate 61 is also referred to as a back plate, a back holder or the like, doubles as a horn plate of a horn mechanism, and is integrally injection molded by, for example, a synthetic resin. In addition, the base plate 61 provided with a base plate portion 66 which corresponds to a case main body, and a peripheral wall portion 67 which is raised up to a front face side over an entire peripheral edge portion on a front face side of the base plate portion 66.

The base plate portion 66 is provided, substantially at its center portion, an inflator attaching portion 69, and, at the inflator attaching portion 69, there are formed an inflator attaching hole in a circular-hole shape, and four attaching holes provided around the inflator attaching hole, which are not illustrated. Furthermore, the base plate portion 66 is integrally provided with fixing portions 70 corresponding to an attaching mechanism which attaches the airbag device 12, to the steering wheel main body 11 so as to be movable forward and backward.

The fixing portions 70 are provided with side fixing portions 73 (corresponding to first and second attaching mechanisms) which are provided respectively on both side portions of the base plate 61, and a lower fixing portion 74 (corresponding to a third attaching mechanism) which is provided at a lower portion of the base plate 61. In addition, each of the fixing portions 73 and 74 is provided with a wire 76 which corresponds to a unit configured to engage, an attaching base 77 to which the wire 76 is attached and which is integrally formed with the base plate portion 66, and a coil spring 78 which corresponds to a unit configured to be energized.

The wire 76 may be referred to as a one-touch wire, is formed by an elastically deformable wire rod, and is provided with a pair of linear engagement receivers 81, an elastic coupling portion 82 corresponding to a unit configured to engage and energize which couples one end portions of the engagement receivers 81 and energizes in a direction in which the engagement receivers 81 are spaced from each other, and an operation portion 83 which is formed by folding the other end portion of the engagement receiver 81.

Furthermore, each of the attaching bases 77 is provided with an engaging unit attaching portion 85 that is an opening portion to which the wire 76 is attached, an energizing unit attaching portion 86 that is a spring receiver to which the coil spring 78 is attached, and a movable contact point portion 87. Moreover, the attaching base 77 of each of the side fixing portion 73 is provided, in a protruding manner, with a guide protruding portion 88 and 88 for guiding the airbag device 12 with respect to the steering wheel main body 11.

The engaging unit attaching portion 85 is arranged along the back face side of the base plate portion 66 of the base plate 61. In addition, the engaging unit attaching portion 85 sets the paired engagement receivers 81 of the wire 76, to a state in which the paired engagement receivers 81 come close to each other against an energizing force, and supports the one engagement receiver 81, so as to be movable in a direction in which the engagement receivers 81 come close to each other against the energizing force and in a state of being partly exposed from the opening portion 85a. Furthermore, at the engaging unit attaching portion 85, there is formed a slit-like guide supporting portion 85b guiding and supporting an operation portion 83 connecting to the engagement receiver 81 in an exposed state, that is, a state in which the operation portion 83 can be operated so as to be pushed. Moreover, the engaging unit attaching portion 85 of the side fixing portion 73 supports the engagement receiver 81 while setting an up-and-down direction along a surface direction of the base plate portion 66 of the base plate 61, to a longitudinal direction, and the engaging unit attaching portion 85 of the lower fixing portion 74 supports the engagement receiver 81 while setting a both-sides direction to a longitudinal direction.

In addition, the respective movable contact point portions 87 face the fixed contact point portions 35c and 52b of the horn mechanisms which are arranged on the steering wheel main body 11 side, and constitute horn switches together with the fixed contact point portions 35c and 52b.

Furthermore, the coil springs 78 are for energizing the airbag device 12 to the front face side with respect to the steering wheel main body 11, one end portions are retained at the energizing unit attaching portions 86 and other end portions are retained at the respective spring receivers 35b and 52a.

Furthermore, the peripheral wall portion 67 surrounds an airbag in a folded state, and is positioned in a direction which is along a protruding direction of the airbag. In addition, an outer portion of the peripheral wall portion 67 is provided with a plurality of hook portions 91 for engaging and retaining the airbag cover 64, a plurality of locking receivers 92, and a plurality of locking pawl portions 93, respectively.

The hook portions 91 are formed into an L-letter shape which protrudes from an outer surface of the peripheral wall portion 67, and are respectively arranged at both side portions, a lower portion and the like of the peripheral wall portion 67 so as to be spaced from each other.

In addition, the locking receivers 92 are provided in a concave manner at positions between the hook portions 91 and 91 over the base plate portion 66, at positions closer to a base end side, that is, a front end side than the hook portions 91 of the peripheral wall portion 67, and are open toward a front side.

Furthermore, the locking pawl portions 93 are arranged between the hook portions 91 and 91, at positions closer to the front face side than the locking receivers 92 of the peripheral wall portion 67.

Moreover, the inflator 62 is provided with a discoid inflator main body portion 62a, and a flange portion 62b which is protruded to an outer peripheral side from the inflator main body portion 62a. In addition, a gas jetport not shown is provided at the inflator main body portion 62a so as to be positioned at a front face side of the flange portion 62b, and attaching holes (not shown) are provided at the flange portion 62b, at four positions. Furthermore, a connector 62c connected to a controller is provided at a bottom portion of the inflator main body portion 62a.

Moreover, the airbag is formed into a flat bag shape, for example, by single base fabric or a plurality of base fabrics, and there is formed an inflator attaching hole formed into a circular-hole shape, and attaching holes provided at four positions so as to surround the inflator attaching hole, which are not shown, in the same manner as the inflator attaching portion 69 of the base plate 61.

In addition, the airbag cover 64 is integrally formed by a synthetic resin having an insulating property, and is provided with a front plate portion 95 corresponding to a cover body which covers a front face side of a part of the steering wheel, and an attaching plate portion 96 corresponding to an attaching wall portion which is provided so as to protrude downward in an angular tube shape from a front face side corresponding to a back face side of the front plate portion 95.

On the front face corresponding to the back face of the front plate portion 95, a tear line, not shown, having a small thickness in a groove shape is formed, for example, substantially in an H-letter shape as seen from a front face, at a position surrounded by the attaching plate portion 96, and is configured such that the airbag is broken open and developed along the tear line when the airbag is inflated.

In addition, the attaching plate portion 96 is positioned on an outer side of the peripheral wall portion 67 of the base plate 61, and is formed along an outer shape of the peripheral wall portion 67. Furthermore, the attaching plate portion 96 is provided with insertion opening portions into and with which the hook portions 91 of the base plate 61 are, respectively, inserted and engaged, locking projections which are, respectively, engaged with the locking receivers 92, and engagement concave portions with which the locking pawl portions 93 are, respectively, engaged, which are not shown.

Moreover, the retainer is formed into a ring shape, and is provided with a retainer base (not shown) which is formed by a metal plate or the like, and four attaching bolts 98 which are fixed to the retainer base. In addition, the retainer base has an inflator attaching hole in a circular-hole shape formed at its center portion. Furthermore, the attaching bolt 98 is provided in a protruding manner on a back face side so as to surround the inflator attaching hole, and is configured such that a nut 99 is threadably engaged with each of the attaching bolts 98.

In addition, in a state in which the retainer is inserted into an inner side of the airbag, and the attaching bolt 98 of the retainer is drawn out of the attaching hole, the airbag is folded in a predetermined shape. Furthermore, the hook portions 91 and the locking pawl portions 93 are inserted into and locked to the insertion opening portions and the engagement concave portions, and the locking projections are inserted into and locked to the locking receivers 92, by putting the airbag cover 64 on the folded airbag, and inserting the attaching bolts 98 of the retainer to the attaching holes and pressing the attaching bolts 98 to the base plate 61 side, while aligning the insertion opening portions, the locking projections and the engagement concave portions of the attaching plate portions 96 of the airbag cover 64 with the hook portions 91, the locking receivers 92 and the locking pawl portions 93 of the peripheral wall portion 67 of the base plate 61. As a result, the airbag cover 64 and the base plate 61 are fixed to each other with one-touch operation (snap-in operation).

Furthermore, the inflator 62 is combined from the back face side of the base plate 61 while inserting the attaching holes to the attaching bolts 98 protruding to the back face side of the base plate 61, and the nuts 99 are threadably engaged with the attaching bolts 98 to thereby be fastened. In this state, the portion on the front face side of the inflator main body portion 62a provided with the gas jet port of the inflator 62 is inserted into the inner side of the airbag from the inflator attaching hole, and the airbag device 12 is constituted.

In contrast, the cover body 24 is combined with the steering wheel main body 11 from the back face side, and the cover body 24 is attached to the steering wheel main body 11 while being positioned by the cover positioning holes 43d, 43d, 59d and the like.

Furthermore, the boss 26a of the steering wheel main body 11 is fitted and attached to the steering shaft, and is fastened and fixed by a nut (not shown).

The airbag device 12 is attached to the steering wheel main body 11 only by being compressed from the front face side, that is, by a so-called one-touch operation. That is, in the case where the airbag device 12 is compressed into the steering wheel main body 11 from the front face side, the engagement pawl portions 43, 43 and 59 provided in the cored bar 21 are engaged with the engagement receivers 81 of the respective wires 76 at the fixing portions 70, and the airbag device 12 is engaged with the steering wheel main body 11 at three positions on both sides and the lower side, to thereby be supported while being prevented from coming off.

In more detail, in the case where the airbag device 12 is compressed, the engagement pawl portions 43, 43 and 59 enter the opening portions 85a, and the engagement receivers 81 of the wires 76 are pressed by the guide surfaces 43b, 43b and 59b, and are moved against the energizing force of the elastic coupling portions 82. Furthermore, when the airbag device 12 is sufficiently compressed and the engagement pawl portions 43, 43 and 59 pass through the wires 76, the wires 76 are deformed so as to return on the basis of the energizing force of the elastic coupling portions 82, and the engagement receivers 81 move, and are locked to the locking surfaces 43a, 43a and 59a of the engagement pawl portions 43, 43 and 59. In addition, in this state, the engagement receivers 81 are energized in a direction in which an amount of engagement is increased, by the energizing force of the elastic coupling portions 82, and the respective engagement receivers 81 are reliably prevented from coming off by the projection portions 43c, 43c and 59c which are provided so as to protrude from the locking surfaces 43a, 43a and 59a of the engagement pawl portions 43, 43 and 59, and are prevented from being unexpectedly detached.

Furthermore, in this state, the guide protruding portions 88 of the airbag device 12 are inserted into the guide receivers 35a of the steering wheel main body 11 so as to be movable forward and backward and are guided along the front-face-to-back-face direction.

Moreover, the respective coil springs 78 of the airbag device 12 come into contact with the spring receivers 35b, 35b and 52a of the steering wheel main body 11 to thereby be supported, and by the energizing force of the coil springs 78, the respective movable contact point portions 87 of the airbag device 12 are supported in a state of being spaced from the fixed contact point portions 35c, 35c and 52b of the steering wheel main body 11.

Furthermore, the steering wheel 10 provided with the airbag device 12 is constituted in a state in which the steering wheel 10 is attached to the steering shaft by electrically wiring the connectors 62c of the inflator 62, for example.

In addition, the steering wheel 10 constituted as mentioned above is operated at the time of traveling, by gripping and turning the rim portion 15 by the occupant in the driver seat. Furthermore, in the case where any movable contact point portion 87 comes into contact with any one the fixed contact point portions 35c, 35c and 52b by the occupant's pushing operation, against the energizing force of the coil springs 78, of the airbag cover 64 of the airbag device 12 doubling as the pressing portion, the horn device in the vehicle body side is ringed.

In contrast, in the case of a head-on collision or the like of the vehicle, the gas is rapidly jetted into the inner portion of the airbag from the inflator 62, and the folded and stored airbag is rapidly inflated. Then, the airbag cover 64 is broken open along the tear line on the basis of the inflation pressure of the airbag, a protruding port of the airbag is formed, and the airbag protrudes from the protruding port to thus be inflated and developed on a front side of the occupant, thereby constraining and protecting the occupant.

Moreover, in the case where the rim portion 15 of the steering wheel main body 11 is pressed via the airbag by the occupant's forward movement or the like, the rim cored bar 25 and the spoke cored bar 27 are deformed, absorb shock and protect the occupant. In more detail, in the case of the head-on collision of the vehicle, the occupant moves forward so as to be thrown out forward, comes into contact with the lower portion of the rim portion 15 which is the closest to the occupant, and presses the lower portion of the rim portion 15 toward a front side shown by an arrow F in FIG. 1 to thereby apply the load. Accordingly, as shown by a two-dot chain line in FIG. 1, the rim cored bar 25 of the rim portion 15 deforms to the boss cored bar 26 side at a position of the deformation allowing portion 25a, and the lower spoke cored bar 27, that is, the lower spoke cored bar 32 coupled to the rim cored bar 25 deforms while moving forward.

At this time, stress generated at the inner portion of the lower spoke cored bar 32 is mainly concentrated only on the bent portions 55 and 56 since the lower spoke cored bar 32 is bent into a crank shape. Therefore, the lower spoke cored bar 32 is configured such that, in the case where the load is applied in the direction shown by the arrow F, the first coupling portion 51 moves to an upper side (an opposite side of the occupant) which is the vertical wall portion 53 side, around the first bent portion 55, the second coupling portion 52 moves to a lower side (an occupant side) which is the vertical wall portion 53 side, around the second bent portion 56, whereby the vertical wall portion 53 including the bent portions 55 and 56 is bent and deformed so as to be folded into an inverse-Z-letter shape (in an S-letter shape) as seen from a side face, and the lower engagement pawl portion 59 of the vertical wall portion 53 moves on to the back face side.

Particularly, the bent portions 55 and 56 are positioned between the center position C between the outer edge portion 25b of the rim cored bar 25 and the coupling position 26b of the second coupling portion 52 and the boss cored bar 26. The coupling position 26b between the second coupling portion 52 and the boss cored bar 26 are positioned closer to the boss cored bar 26 (the coupling position 26b) side than the center position C, in the present embodiment. Thus the vertical wall portion 53 including the bent portions 55 and 56 bends and deforms so that the vertical wall portion is reliably folded into an inverse-Z-letter shape (an S-letter shape) as seen from the side face, and the lower engagement pawl portion 59 of the vertical wall portion 53 moves on to the back face side. In other words, the lower engagement pawl portion 59 is inclined and moved in a pawl catching direction of increasing an amount of engagement of the engagement receiver 81 of the engaged wire 76, deforms so that the lower engagement pawl portion further grips the engagement receiver 81 on an innermost side, and reliably retains the engagement receiver 81, that is, the airbag device 12 without being detached.

Furthermore, the first coupling portion 51 and the second coupling portion 52 mainly deform or the like only in the front-face-to-back-face direction in which the thicknesses of the rod-like portions 45 and 45 are relatively small, since the cross-sectional shapes of the rod-like portions 45 and 45 which are spaced parallel to each other are rectangular, so that the deforming direction is stably controlled. Moreover, in the lower spoke cored bar 32, by the rod-like portions 45 and 45 which are parallel to each other and have a linear configuration as seen from the occupant side, all the load transmitted to the lower spoke cored bar 32 among the load shown by the arrow F is converted into the deformation mentioned above, and it is possible to suppress deformation such as torsion or flexure of the lower spoke cored bar 32, excluding this deformation. In addition, the deformation allowing portion 25a of the rim cored bar 25 arranged substantially on the same line L as the vertical wall portion 53 which is coupled to the first coupling portion 51 and the second coupling portion 52 via the bent portions 55 and 56 bends and deforms to the boss portion 16 side.

As mentioned above, since the steering wheel main body 11 easily and reliably deforms, and the deforming direction is substantially fixed regardless of a magnitude and a direction of the load and has a reduced fluctuation, it is possible to suppress the dispersion of the deforming load, and it is possible to stably and efficiently absorb the load on the basis of the deformation of the steering wheel main body 11.

That is, it is possible to reduce a bending reaction force of the steering wheel main body 11 in the case where the occupant comes into collision with the steering wheel 10, and it is possible to reduce an injury value.

Furthermore, in the case where the occupant moves to the steering wheel 10 side and comes into contact with the steering wheel main body 11 when receiving the shock or the like of the collision, the spoke cored bar 27 deforms by the force applied from the occupant side so that the first bent portion 55 comes close to the boss cored bar 26 side and the second bent portion 56 side, whereby the lower engagement pawl portion 59 moves forward to the boss cored bar 26 side, and an engaging amount of the lower engagement pawl portion 59 with the engagement receiver 81 is increased.

Particularly, in the case where the first bent portion 55 in a bending format the one end portion of the vertical wall portion 53, and the second bent portion 56 in a bending format the other end portion of the vertical wall portion 53 are positioned between the center position C between the outer edge portion 25b of the rim cored bar 25 in the spoke cored bar 27 and the coupling position 26b of the second coupling portion 52 and the boss cored bar 26, and the coupling position 26b between the second coupling portion 52 and the boss cored bar 26, for example, closer to the boss cored bar 26 (the coupling position 26b) than the center position C, like the present embodiment, the spoke cored bar 27 can be reliably deformed so that the first bent portion 55 comes close to the boss cored bar 26 side and the second bent portion 56 side, on the basis of the force applied from the occupant side, when the occupant moves to the steering wheel 10 side and comes into contact with the steering wheel main body 11, by receiving the shock or the like of collision. Accordingly, the airbag device 12 can be reliably engaged with the steering wheel main body 11 to thereby be retained. As a result, it is possible to more reliably engage and retain the airbag device 12 with respect to the deformation of the steering wheel main body 11.

Moreover, in the case where the first and second bent portions 55 and 56 are formed as the weak portion which is more easily deformed than the other portions of the vertical wall portion 53, and the deformation allowing portion 25a is formed as the weak portion which is more easily deformed than the other portions of the rim cored bar 25, the first and second bent portions 55 and 56 of the spoke cored bar 27 and the deformation allowing portion 25a of the rim cored bar 25 are more reliably deformed on the basis of the force applied from the occupant side, when the occupant moves to the steering wheel 10 side and comes into contact with the steering wheel main body 11 by receiving the shock or the like of the collision, and thus it is possible to more efficiently absorb the load.

Furthermore, the rim cored bar 25 (the rim portion 15) can be lightened by providing the rim cored bar 25, with the deformation allowing portion 25a which is made narrower than the other portions of the rim cored bar 25, and it is possible to improve an operability of the steering wheel 10.

Figure 6:
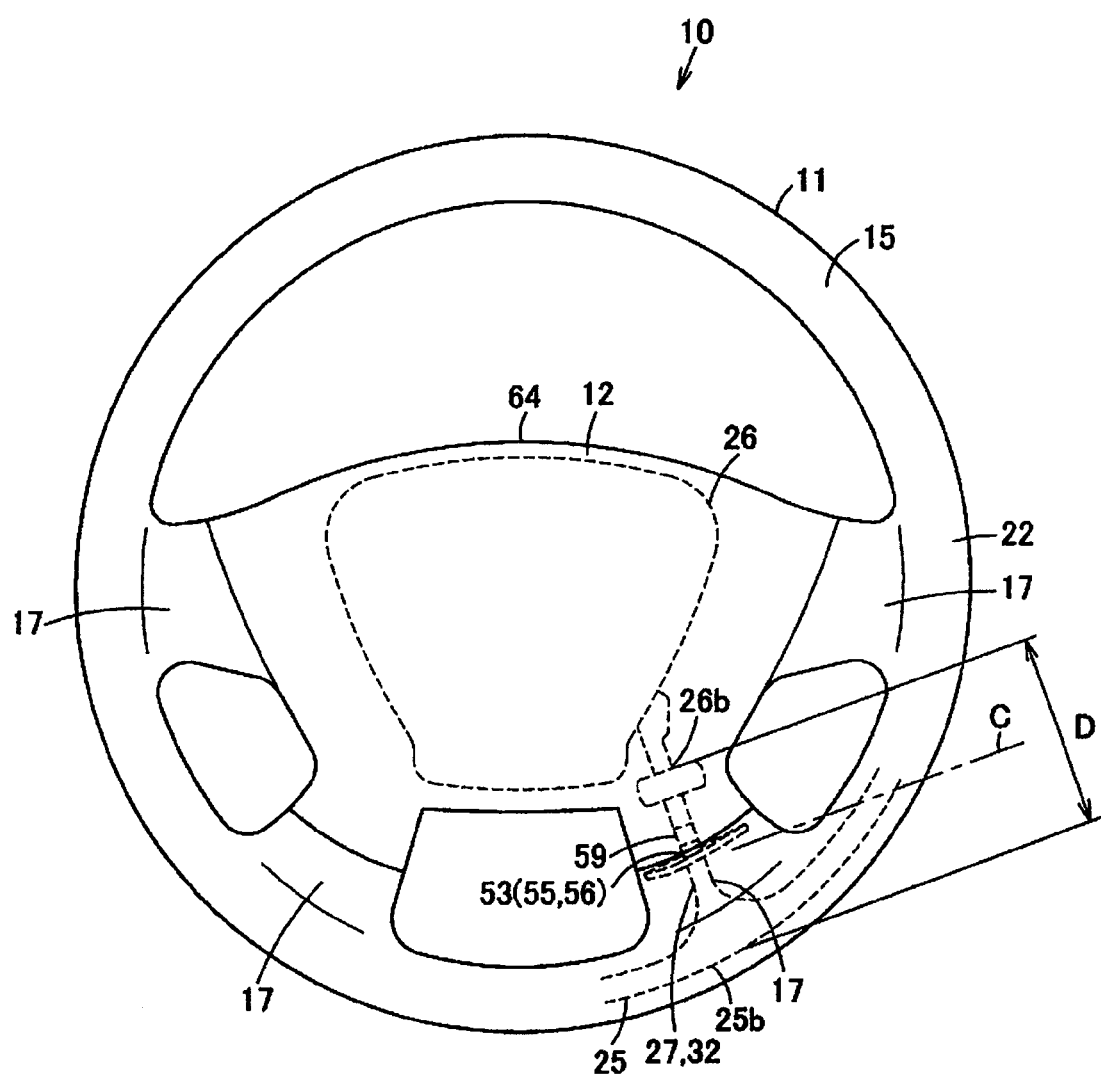
FIG. 6 shows the other embodiment according to the present invention and is a plan view of a cored bar of a handle.

Note that, in the embodiment mentioned above, the steering wheel main body 11 may have a configuration or the like having four spoke portions 17, like the other embodiment shown in FIG. 6. Even in this case, the same operations and effects as those of the embodiment mentioned above can be achieved by forming the vertical wall portion 53 in each of the lower spoke cored bars 32 which extend so as to be inclined downward from the lower portion of the boss cored bar 26, among the spoke cored bars 27 constituting the spoke portion 17, and arranging, substantially on the same line L, the vertical wall portions 53 and the deformation allowing portions 25a and 25a of the rim cored bar 25.

Furthermore, the first and second coupling portions 51 and 52 of the lower spoke cored bar 32 are formed by two rod-like portions 45 which are parallel to each other, but may be formed by one rod-like portion.

Moreover, the handle is formed as the steering wheel 10 having the annular rim portion 15, but the present invention can be applied to a handle provided with a circular-arc shaped rim portion, for example, having a discontinuous upper end portion. The embodiments of the present invention are not limited to this above mentioned configuration.

In addition, the first bent portion 55 and the second bent portion 56 are not limited to the configuration in which they are positioned between the center position C between the outer edge portion 25b of the rim cored bar 25 in the spoke cored bar 27 and the coupling position 26b of the second coupling portion 52 and the boss cored bar 26, and the coupling position 26b between the second coupling portion 52 and the boss cored bar 26. The first bent portion 55 and the second bent portion 56 may be positioned, for example, in the vicinity of the center position C, and at the time of collision of the vehicle, the first coupling portion 51 moves to the upper side (the opposite side to the occupant) and the second coupling portion 52 moves to the lower side (the occupant side) that is the vertical wall portion 53 side at the time of the load application in the direction shown by the arrow F, whereby the vertical wall portion 53 including the bent portions 55 and 56 can be deformed so as to be folded into an inverse-Z-letter shape (an S-letter shape) as seen from the side face.

The present application claims priority based on Japanese Patent Application No. 2012-212983 filed on Sep. 26, 2012, and Japanese Patent Application No. 2013-067920 filed on Mar. 28, 2013, and all the contents of these two applications are incorporated herein by reference.

INDUSTRIAL APPLICABILITY

The present invention can be applied to, for example, a steering wheel of a motor vehicle provided with an airbag device.

DESCRIPTION OF REFERENCE NUMERALS 10 steering wheel (handle)
11 steering wheel main body (handle main body)
12 airbag device (module)
15 rim portion
16 boss portion
17 spoke portion
25 rim cored bar
25a deformation allowing portion
25b outer edge portion
26 boss cored bar
26b coupling position
27 spoke cored bar
51 first coupling portion
52 second coupling portion
53 vertical wall portion (continuous portion)
55 first bent portion
56 second bent portion
59 lower engagement pawl portion (engagement pawl portion)
81 engagement receiver
C center position

What is claimed is:

1. A handle comprising:
a handle main body comprising:
   an operating rim portion arranged at a position facing an occupant;
   a boss portion connected to a steering device;
   a plurality of spoke portions connecting the rim portion and the boss portion;
   a rim cored bar constituting the rim portion;
   a boss cored bar constituting the boss portion; and
   a plurality of spoke cored bars constituting, the spoke portions, and
a module attached to the handle main body,
wherein ends of each of the spoke cored bars are connected to the rim cored bar and the boss cored bar,
wherein the plurality of spoke cored bars comprise
   side spoke cored bars extending from the boss cored bar to both sides of the rim cored bar, and
   a lower spoke cored bar extending downward from the boss cored bar to the rim cored bar,
wherein the lower spoke cored bar is provided with a first coupling portion, a second coupling portion and a continuous portion,
wherein one end portion of the first coupling portion is coupled to the rim cored bar,
wherein one end portion of the second coupling portion is coupled to the boss cored bar,
wherein the continuous portion is not connected to the side smoke cored bars in a direction orthogonal to or substantially orthogonal to the extending direction of the lower spoke cored bars,
wherein the continuous portion has a first bent portion coupled to the other end portion of the first coupling portion at its one end portion,
wherein the continuous portion has a second bent portion coupled to the other end portion of the second coupling, portion at its other end portion,
wherein the handle main body is further provided with an engagement pawl portion provided in a protruding manner in the lower spoke cored bar,
wherein the module is provided with an engagement receiver engaged with the engagement pawl portion, and
wherein the engagement pawl portion is arranged at the continuous portion, and is arranged at a position between the first bent portion and the second bent portion.

2. The handle according to claim 1,
wherein the first bent portion and the second bent portion are positioned between a center position which is between two positions of an outer edge portion of the rim cored bar and a coupling position of the second coupling portion and the boss cored bar, and the coupling position of the second coupling portion and the boss cored bar.

3. The handle according to claim 1,
wherein the first bent portion and the second bent portion are weak portions more easily deformed than the other portions of the continuous portion.

4. The handle according to claims 1,
wherein the rim cored bar has a plurality of deformation allowing portions capable of being deformed, and
wherein the continuous portion and the deformation allowing portions are arranged substantially on the same straight line.

5. The handle according to claim 4,
wherein the deformation allowing portions are weak portions more easily deformed than the other portions of the rim cored bar.

* * * * *